United States Patent [19]

Wegman et al.

[11] Patent Number: 5,008,235
[45] Date of Patent: Apr. 16, 1991

[54] CATALYSTS OF CU-AL-THIRD METAL FOR HYDROGENATION

[75] Inventors: Richard W. Wegman; David R. Bryant, both of South Charleston, W. Va.

[73] Assignee: Union Carbide Chemicals and Plastics Technology Corporation, Danbury, Conn.

[21] Appl. No.: 454,456

[22] Filed: Dec. 21, 1989

[51] Int. Cl.$^5$ .................. B01J 21/04; B01J 21/06; B01J 23/02; B01J 23/72

[52] U.S. Cl. .................. 502/342; 502/341; 502/346

[58] Field of Search .............. 502/331, 341, 342, 346

[56] References Cited

U.S. PATENT DOCUMENTS

| | | | |
|---|---|---|---|
| 1,813,953 | 7/1931 | Reppe | 568/405 |
| 1,830,705 | 11/1931 | Marx et al. | 502/346 X |
| 2,109,844 | 3/1938 | Lazier | 568/885 |
| 2,110,483 | 3/1938 | Guyer | 260/156 |
| 2,290,439 | 7/1942 | Lenth et al. | 260/635 |
| 2,297,769 | 10/1942 | Ipatieff et al. | 502/346 X |
| 2,586,535 | 2/1952 | Ipatieff et al. | 260/667 |
| 2,627,506 | 2/1953 | Hunter et al. | 502/346 |
| 2,825,743 | 3/1958 | MacLean et al. | 502/342 X |
| 2,895,920 | 7/1959 | Janoski | 502/234 |
| 3,267,157 | 8/1966 | Miya | 568/885 |
| 3,420,901 | 1/1969 | Schulz | 260/659 |
| 3,767,595 | 10/1973 | Montgomery | 502/244 |
| 3,790,505 | 2/1974 | Casey et al. | 252/463 |
| 3,896,053 | 7/1975 | Broecker et al. | 252/466 T |
| 3,933,930 | 1/1976 | Dougherty et al. | 260/635 D |
| 4,009,124 | 2/1977 | Laurer et al. | 252/463 |
| 4,048,196 | 9/1977 | Broecker et al. | 260/346.11 |
| 4,144,198 | 3/1979 | Miya et al. | 252/466 T |
| 4,209,424 | 6/1980 | LeGoff et al. | 252/474 |
| 4,250,111 | 2/1981 | Seale et al. | 564/129 |
| 4,252,689 | 2/1981 | Miya | 252/466 T |
| 4,278,567 | 7/1981 | Miya | 252/466 T |
| 4,279,781 | 7/1981 | Dienes et al. | 252/463 |
| 4,393,251 | 7/1983 | Broecker et al. | 568/811 |
| 4,450,245 | 5/1984 | Adair et al. | 502/211 |
| 4,480,122 | 10/1984 | Horlenko et al. | 560/239 |
| 4,584,419 | 4/1986 | Sharif et al. | 568/864 |
| 4,593,015 | 6/1986 | Hardman et al. | 502/303 |
| 4,600,704 | 7/1986 | Jennings | 502/318 |
| 4,762,817 | 8/1988 | Logsdon et al. | 502/329 |

FOREIGN PATENT DOCUMENTS

| | | |
|---|---|---|
| 0074193 | 3/1983 | European Pat. Off. . |
| 0143634 | 6/1985 | European Pat. Off. . |
| 55-31428 | 3/1980 | Japan . |
| WO83/03409 | 10/1983 | PCT Int'l Appl. . |
| 2150550A | 4/1985 | United Kingdom . |

Primary Examiner—W. J. Shine
Attorney, Agent, or Firm—Reynold J. Finnegan

[57] ABSTRACT

A process for hydrogenating feeds into their corresponding alcohols by contact with a coprecipitated catalyst comprising copper, aluminum, and a metal (X) selected from the group consisting of magnesium, zinc, titanium, zirconium, tin, nickel, cobalt and mixtures thereof; that has been reduced with an increasing temperature during the reduction.

1 Claim, No Drawings

CATALYSTS OF CU-AL-THIRD METAL FOR HYDROGENATION

FIELD OF THE INVENTION

The invention relates to a process for the catalytic vapor phase hydrogenation of bound oxygen-containing organic compounds and particularly to the catalytic hydrogenation of esters.

DESCRIPTION OF RELATED TECHNOLOGY

The hydrogenation of, for example, mono-esters normally yields alcohols according to a simple relationship:

$$RC(O)OR' + 2H_2 \rightarrow R'OH + RCH_2OH$$

The hydrogenation of diesters generally results in a more complicated product mixture. For example, the hydrogenation of a dialkyl maleate typically results in the formation of several products, the amount of each depending on the reaction conditions:

$$ROC(O)CH=CHC(O)OR + xH_2 \rightarrow 2ROH + 1,4\text{-Butanediol} + \text{Tetrahydrofuran} + \text{gamma-Butyrolactone}$$

The concentrations of each of the products are a function of the equilibrium reaction conditions of the process, e.g. temperature, pressure, liquid hourly space velocity (LHSV), and gas hourly space velocity (GHSV). Like most hydrogenation reactions, the processes are usually catalyzed and are affected strongly by the composition of the catalyst used in the process. Typical hydrogenation catalysts for esters are a combination of reduced copper and zinc (GB No. 2,150,560 and WO No. 83/03409) or reduced copper-chromite (U.S. Pat. Nos. 2,100,483; 3,767,595; and 4,584,419). Various promoters can be added as disclosed in U.S. Pat. No. 2,109,844 (barium or cadmium).

U.S. Pat. Nos. 2,297,769; 4,209,424; 4,593,015; and 4,600,704 and EP No. 143,634 discuss particular reduction activation processes for copper-based catalysts.

In EP No. 143,634 the vapor phase hydrogenation of diethyl maleate is reported. The hydrogenation reaction is carried out with a copper-chromite catalyst at 170°-190° C. and approximately 450 psig. It is disclosed that controlled reduction of the catalyst is necessary to ensure high catalyst activity. The reduction process involves a rapid heating of the precursor catalyst directly to the final reduction temperature and maintaining that temperature more or less constant over the entire reduction period.

SUMMARY OF THE INVENTION

It is an objective of the invention to provide an activated, copper-based catalyst for the hydrogenation of bound oxygen-containing organic compounds.

It is another objective to provide a process that results in an active, selective catalyst and a hydrogenation process using such a catalyst. Other objectives will become apparent from the description contained herein.

In accordance with one aspect, the invention comprises an active hydrogenation catalyst composition produced by reducing a precursor catalyst containing a homogeneous mixture of oxides of aluminum, copper, and a metal, X, selected from the group consisting of magnesium, zinc, titanium, zirconium, tin, nickel, cobalt and mixtures thereof by heating in the presence of a reducing gas under activation conditions which comprise a gradually increasing temperature from a starting temperature of about 40° to 75° C. to a final temperature of about 150° to 250° C. The catalyst is useful for catalyzing the vapor phase hydrogenation of esters, in particular, and bound oxygen-containing compounds, in general, when contacted at suitable hydrogenation conditions to produce various hydrogenated products such as alcohols. For example, the catalyst of the present invention can be used to hydrogenate diethyl maleate to produce a hydrogenated product mixture containing inter alia, such desired products as ethanol, tetrahydrofuran, 1,4-butanediol and gamma-butyrolactone.

The process according to the invention produces catalysts that provide high rates of conversion with control over the distribution of products.

DETAILED DESCRIPTION OF THE INVENTION

The catalyst of the invention, which is useful in the inventive process, is a reduced combination of copper, aluminum, and a metal (X) selected from the group consisting of magnesium, zinc, titanium, zirconium, tin, nickel, cobalt, and mixtures thereof. The weight ratio of Cu:Al:X in the catalyst can vary widely. Active catalysts have an elemental weight ratio (Cu:Al:X), based on one hundred parts of metal of about 10-80:1-30:-10-80. More preferably, the catalyst contains about 10-20 wt % Al with the remainder being copper and X. Most preferably, the catalyst contains a Cu:Al:X weight ratio, based on one hundred parts of metal in the catalyst of about 10-70:15-20:10-70.

The catalyst can be made by a controlled reduction of a catalyst precursor containing a more or less homogeneous mixture of the oxides of copper, aluminum and X. The catalyst precursor can be made by co-precipitation from water-soluble salts and/or by mixing finely divided oxides of copper, aluminum, and X in the desired weight ratio. Co-precipitation is preferred. Contemplated water-soluble salts include the sulfates and nitrates of copper and aluminum. Preferred are the nitrate salts of each component. For example, a catalyst of copper, aluminum, and titanium can be made by dissolving copper and aluminum nitrate in water then adding titanium dioxide, preferably in fine powder form or as a colloid, to form a slurry. A catalyst precipitate then is formed by precipitating copper and aluminum from this slurry for example by adding sodium carbonate. The precipitated catalyst is dried at a slightly elevated temperature, e.g. about 80° to about 120° C., and calcined in air at about 300° to about 550° C. to form a catalyst precursor containing a homogeneous mixture of the oxides of copper, aluminum and titanium. Other methods of forming an intimate and substantially homogeneous mixture of the metal salts and/or their oxides can be used to prepare the catalyst precursor if desired.

Catalysts according to the invention are prepared by heating the calcined mixture of copper, aluminum, and X (i.e., the metal oxide-containing catalyst precursor) in a reducing atmosphere at a gradually increasing temperature, typically from a starting temperature of between about 40° to 75° C. to a final reduction temperature of between about 150° to 250° C., preferably to a final reduction temperature of between about 160° to 220° C. and most preferably from a starting temperature of about 50° C. to a final temperature of about 180° C. The temperature is gradually increased, normally by increasing the temperature of the reducing atmosphere, at a positive rate of less than about 24° C./hr (0.4° C./min), preferably at a rate of about 3°–18° C./hr (about 0.05°–0.3° C./min), and most preferably at a rate of about 3°–6° C./hr (0.05°–0.1° C./min). Normally, the heating rate and conditions are chosen to produce a catalyst composition having a high activity to maximize hydrogenation efficiency, e.g., the formation of alcohols. However, in certain instances, as may be encountered when hydrogenating diesters, such as dialkyl maleates, it may be desired to optimize the reduction conditions to produce a catalyst that favors the production of one or more hydrogenation products relative to others. For example, in the case of hydrogenating diethyl maleate, reduction conditions may be selected to provide a catalyst that favors the production of tetrahydrofuran, or gamma-butyrolactone relative to ethanol or 1,4-butanediol.

The heating rate should also be chosen to minimize or avoid the generation of an exothermic temperature rise in the catalyst which can result during the reduction of Cu-Al catalysts. See, U.S. Pat. Nos. 2,297,769; 4,209,424; 4,593,015; and 4,600,704 all of which are incorporated herein by reference.

The reduction process according to the invention can be monitored to avoid the occurrence of an exotherm by comparing the rate at which the catalyst bed temperature changes with the rate at which the temperature would increase in the absence of any exothermic reduction as a consequence of the heating rate applied with external means, e.g. heated reducing gas, resistance heaters around and/or throughout the catalyst bed, etc.

If desired, a variable rate of temperature increase obtained, for example, by combining different temperature increase rates within the ranges identified above, also can be used to produce a catalyst according to the invention, e.g. the precursor catalyst can be reduced by initially increasing the temperature at a rate of 0.06° C./hr for 2 hours followed by further reduction at a temperature which is increasing at a rate of 0.5° C./hr for 3 hours, etc.

Exemplary reducing gases include hydrogen, carbon monoxide, and mixtures thereof in addition to other reducing gases known to those in this art. The reducing gas can be supplied at a pressure of about 1–20 atm. and may be supplied in admixture with an inert gas. If an inert gas is used, the reducing gas to inert gas volumetric ratio can be about 0.1:20 to about 10:1. Suitable inert gases include, inter alia, nitrogen, argon, and methane. The GHSV in the reduction step can be within the range of about 100 to about 100,000 per hour.

The length of the reduction period depends upon the initial reduction temperature, the final reduction temperature, and the rate of temperature increase. Generally, reduction (activation) of the precursor catalyst is done over a period of about 12 to 48 hours. The resulting catalyst is useful for catalyzing the hydrogenation of bound oxygen-containing organic compounds and particularly esters to produce alcohols and other desired products.

A variety of organic feeds containing bound oxygen may be hydrogenated using the reduced copper-aluminum catalysts of the invention. Suitable feeds include: (1) aromatic and nonaromatic (aliphatic and alicyclic carboxylic acids having more than one carbon atom per carboxyl group), esters of monobasic acids exemplified by acetic, propionic, butyric, caprylic, lauric, capric, myristic, palmitic, linoleic, oleic, ricinoleic, stearic, hexahydrobenzoic and hexahydrotoluic acids; (2) esters of nonaromatic, dibasic and polybasic acids exemplified by hexahydrophthalic, azelaic, sebacic, succinic, suberic, pimelic, nonanedicarboxylic, decamethylenedicarboxylic, brassylic, and adipic acids, dodecamethylenedicarboxylic, and hexadecamethylenedicarboxylic acids; (3) esters of hydroxy, aldehydic, and ketonic acids, e.g. lactic, ricinoleic, tartaric, and pyruvic acids; (4) mixtures of esters such as those listed above or obtained as a result of the saponification of a fat such as coconut oil; (5) esters of hydroaromatic acids; (6) mono- and dialkyl oxalates; (7) mono-esters, di-esters, and mixtures thereof; and (8) straight or branched chain, saturated or unsaturated aldehydes containing from 2 to about 22 carbon atoms.

The general formula for mono-esters suitable for hydrogenating using the catalytic process of the present invention is $R^1C(O)OR^2$ where $R^1$ and $R^2$ may be the same or different and represent aliphatic groups having from 1 to about 22 or more carbon atoms. Exemplary mono-esters are methyl acetate, butyl acetate, and methyl propionate. Suitable Di-esters have the general formula $R^3OC(O)R^4C(O)OR^5$. $R^3$ and $R^5$ have the same definitions as for $R^1$ and $R^2$ above. $R^4$ is the bridge between the two ester groups and can be a saturated or unsaturated hydrocarbon moiety having from 1 to about 10 or more carbon atoms. Exemplary di-esters that can be hydrogenated according to the invention include esters having up to about 16 or more carbon atoms of primary or secondary alcohols, e.g. dialkyl maleates and dialkyl succinates. Mono-esters and di-esters may be hydrogenated individually or in combination.

As noted above, the catalyst of the present invention can also be used for hydrogenating a wide variety of straight or branched chain, saturated or unsaturated aldehydes containing from 2 to 22 carbon atoms. The range of useful feed stocks is limited only by the practicality of vaporizing the higher boiling aldehydes. Any technique that can vaporize the aldehyde is useful for extending the range of feed stocks for hydrogenation with the catalysts according to the invention. Suitable aldehydes include saturated aldehydes like acetaldehyde, propionaldehyde, iso-butyraldehyde, n-butyraldehyde, isopentyl aldehyde, 2-methylpentaldehyde, 2-ethylhexaldehyde, 2-ethylbutyraldehyde, n-valeraldehyde, iso-valeraldehyde, caproaldehyde, iso-hexaldehyde, caprylaldehyde, n-nonylaldehyde, n-decanal, dodecanal, tridecanal, myristic aldehyde, pentadecaldehyde, palmitic aldehyde, stearic aldehyde and such unsaturated aldehydes as acrolein, methacrolein, ethacrolein, 2-ethyl-3-propylacrolein, crotonaldehyde and the like. The aldehyde may be in a substantially pure state or mixed with a component or components other than the aldehyde itself. Furthermore, a mixture of aldehydes may be employed.

The aldehyde or mixture of aldehydes employed may be obtained by an oxo process. Either a portion or all of the product mixture of an oxo process, i.e., the reaction of olefins with carbon monoxide and hydrogen in the presence of a catalyst to add a carbonyl group at one of the carbon atoms of the olefinic group, can be used. Of course, the aldehyde or mixture of aldehydes can be obtained by processes other than the oxo process such as by oxidation of olefins or saturated hydrocarbons or by an aldol condensation. The present invention is not limited to the source of any particular aldehyde or others bound oxygen-containing compound.

In accordance with the process of the present invention, the bound oxygen-containing, organic compound feed, in a vaporous state, is brought into contact with the hydrogenation catalyst in the presence of a reducing gas, e.g. a hydrogen-containing gas. Although substantially pure hydrogen can be used, it is preferable in some cases to provide the hydrogen to the reaction in admixture with other gases, desirably inert to the feed and catalyst. Suitable inert gases for mixing with hydrogen are nitrogen, methane, and argon. The term "hydrogen-containing gas" includes both substantially pure hydrogen gas as well as gaseous mixtures containing hydrogen.

While the concentration of hydrogen in the reaction zone is not critical, generally there should be an excess of hydrogen over the stoichiometric requirement relative to the organic feed to be hydrogenated. The mole ratio of hydrogen to organic feed will usually be from about 5 to about 400 and preferably from about 10 to 200.

The process of the present invention preferably is carried out in a continuous manner. In the preferred method of continuous operation, the organic feed or the mixture of organic feeds are vaporized as needed and brought together with the hydrogen-containing gas at the desired temperature and pressure in the presence of the catalyst of the present invention.

An inert diluent, such as an aliphatic hydrocarbon, may be fed into the hydrogenation reactor along with the organic feed being hydrogenated. Alkanes such as pentane or hexane are examples of suitable diluents. The volumetric ratio of ester to diluent may vary with the reactor system but can typically be within about 0.5 to about 4. Other ratios may be used both above and below this range.

The catalyst advantageously may be used in a fixed, fluidized, ebullating, or moving catalyst bed reactor. Preferably, a fixed bed is used in an elongated tubular reactor having the catalyst supported downstream from a vaporizing section of inert contact particles. Adiabatic tank type reactors also can be used. In such reactors, the heat of reaction causes an increase in reaction temperature from reactor inlet to reactor outlet.

The hydrogenation may be effected at a temperature of about 100°–300° C., at a pressure of about 200–2000 psig, about 0.1–10/hr LHSV, and about 1,000–50,000/hr GHSV. Preferably, the reaction is conducted at a temperature of 120°–260° C., at a pressure of less than about 600 psig, and about 0.1–4/hr LHSV. In view of the need to maintain the organic reactant feeds and reaction products (typically alcohols) in the vaporous state and above their dew points, the chosen reaction pressure is influenced somewhat by the reaction temperature, the nature of the organic feed undergoing hydrogenation, and the quantity of hydrogen-containing gas. Optimizing these factors to operate the process in the vapor phase is within the ordinary skill level existing in this art. The hydrogenation may be effected in one or more stages.

As used herein, LHSV refers to the feed rate of the organic feed component passed to the catalyst bed as a liquid divided by the unit volume of catalyst of the bed. In a parallel definition, GHSV refers to the volumetric feed rate of all gas or vapor components fed to the catalyst bed at standard temperature and pressure divided by the unit volume of the catalyst bed.

Appropriate organic feeds and processing sequences for use with the invention are set forth in U.S. Pat. Nos. 2,079,414; 4,032,458; 4,172,961; 4,112,245; 4,584,419; and 4,762,817 the disclosures of which are herein incorporated by reference.

The following examples are presented to illustrate the invention: the examples are not intended to limit the scope of the invention as set forth in the appended claims.

EXAMPLES

Preparation of Catalyst Precursor

An active hydrogenation catalyst according to the invention is made by first preparing a precursor catalyst composition. The precursor catalyst then is subjected to an activation (reduction) treatment under carefully controlled conditions in accordance with the present invention.

A precursor catalyst can be prepared by dissolving copper nitrate, aluminum nitrate, and a compatible water soluble salt of X in deionized water at 25° C. The solution of metal salts and a separate solution of sodium carbonate are individually heated to about 45°–75° C. The carbonate solution is quickly added to the metals solution with rapid stirring to produce a precipitate. The precipitated mixture is stirred while cooling to 25° C. The precipitate is isolated, washed with deionized water, dried in air at a slightly elevated temperature, e.g. about 80° C. to about 120° C., and then calcined in air at about 300° to about 550° C. The resulting material which comprises the hydrogenation catalyst precursor is pressed into pellets and crushed into particles of about 30–40 mesh. It is to be understood that the drying step may be combined with the calcination step if desired.

For example, a Cu(56):Al(16):Zn(28) catalyst precursor can be prepared in the following manner. A first solution (Solution A) is prepared by dissolving appropriate amounts of $Cu(NO_3)_2.3H_2O$, $Al(NO_3)_3.H_2O$, and $Zn(NO_3)_2.6H_2.H_2O$ in 200 mL deionized water (25° C.). A second solution (Solution B) is prepared by dissolving $Na_2CO_3$ (30 g) in 100 mL deionized water (25° C.). Solutions A and B are heated to 60° C. Solution B is then quickly added with rapid stirring to Solution A resulting in formation of a precipitate. This slurry mixture is stirred for about 3 hr while cooling to 25° C. The precipitate is isolated and washed with 1000 mL of deionized water (25° C.). The precipitate then is dried in air at 100° C. for 18 hr and calcined in air at 400° C. for 2 hr. The resulting material which constitutes the catalyst precursor is pressed into pellets and crushed into particles in the 30/40 mesh range.

The hydrogenation catalyst precursors used in the following examples were made using substantially the same process described above with appropriate amounts of the other respective metals substituted for zinc. In the case of a Cu-Al-Ti catalyst precursor, copper and aluminum nitrate are first dissolved in water and then colloidal $TiO_2$ is added to the solution which results in the formation of a slurry. All other process steps remain the same as above.

Reduction and Hydrogenation Procedures

The precursor catalysts made in this manner are then reduced in accordance with the present invention. Unless otherwise stated in the examples which follow, 0.5 or 1 cc of (unreduced) precursor catalyst is loaded into the rear third of a stainless steel reaction tube. The reaction tube is a U-tube design where the first two-thirds of the tube is packed with inert glass beads. This front section serves as a gas and liquid preheater. The precursor catalyst is activated in situ with a mixture of 0.5% hydrogen in a stream of nitrogen at a standard GHSV of 1800/hr, at an initial temperature of about 50° C. with the temperature gradually increased at a rate of between 0.05° C./min (3° C./hr) to 0.1° C./min (6° C./hr) to a final temperature of about 180° C. in an oven equipped to handle four reaction tubes.

Once reductive activation is completed, the gas flow is switched to pure hydrogen, and the pressure and flow rate are adjusted to the desired hydrogenation conditions. The liquid feed rate of the ester together with diluent (hexane) then is adjusted to the desired flow rate. The diluent ratio is typically 1:1 by volume for the examples. Due to the preheater section, the ester feed is vaporized and contacts the catalyst as a vapor. Again, unless otherwise stated in the examples, ester hydrogenation was carried out at a temperature of 220° C., a pressure of 450 psig, LHSV of 0.6/hr and a GHSV of 15000/hr.

The hydrogenation reaction conditions are maintained for 20 hours. During the last 4 hours, hydrogenation products are collected by passing the reactor effluent through a series of condensation traps containing isopropanol maintained at 0° to −75° C. The products are analyzed with a capillary gas chromatograph using a 30 mm×0.32 mm capillary. The products are reported in the examples in terms of weight percent and exclude any isopropanol or inert diluent.

EXAMPLES 1-12

These examples demonstrate that the method utilized to activate a catalyst can have a marked impact on catalyst performance. In Examples 1, 2, 4, 5 and 7-12, the precursor catalysts were heated at a low, constant heat rate to cause the catalyst temperature to increase gradually over the range of 50°-180° C. in the presence of a reducing atmosphere of 1% $H_2$ in $N_2$. The catalysts of Examples 3 and 6 were obtained by activating the precursor catalysts according to the procedure outlined in EP No. 143,634 for a copper-chromite catalyst. According to the EP procedure, the precursor catalyst is heated rapidly (within 10 min.) to a temperature of 150° C. under an atmosphere of 0.5% $H_2/N_2$ and maintained at 150° C. for 22 hr.

The effect of varying the catalyst heat rate during activated (reduction) on catalyst performance is reported in Table 1. The weight ratio of the catalyst elements is shown in the parentheses. Note that the recorded time is the time required to traverse the 50°-180° C. temperature range at the given heat rate.

Table 1, and succeeding tables associated with the subsequent examples, report the weight percent of various components in the hydrogenated product stream including ethanol (EtOH), tetrahydrofuran (THF), butanol (BuOH), gamma-butyrolactone (g-BL), 1,4-butanediol (BD) and diethyl succinate (DES). The level of DES, an undesired product in the hydrogenation product provides an indication of catalyst activity. Lower levels of DES in the hydrogenation product indicate higher hydrogenation activities for the catalysts.

Based on the amount of DES in the product mixture, the most desirable catalysts activated according to the invention have a more desirable product mixture than the catalysts of examples 3 and 6 which used a constant temperature during the reduction.

TABLE 1

| | | Various Reduction Procedures | | | | | | |
|---|---|---|---|---|---|---|---|---|
| | | Heat[1] | | Products | | | | |
| Ex. | Catalyst | Rate | Time[2] | EtOH | THF | g-BL | BD | DES |
| 1 | Cu(56)Al(16)Mg(28) | 0.3 | 7.2 | 42.1 | 1.1 | 22.3 | 9.0 | 23.11 |
| 2 | Cu(56)Al(16)Mg(28) | 0.1 | 21.6 | 64.3 | 3.9 | 24.4 | 4.4 | 0.0 |
| 3 | Cu(56)Al(16)Mg(28) | EP | — | 45.9 | 2.9 | 26.9 | 10.3 | 10.0 |
| 4 | Cu(27)AL(12)Ti(61) | 0.3 | 7.2 | 32.6 | 0.5 | 15.6 | 8.8 | 41.0 |
| 5 | Cu(27)AL(12)Ti(61) | 0.1 | 21.6 | 64.1 | 1.9 | 24.4 | 6.6 | 0.0 |
| 6 | Cu(27)AL(12)Ti(61) | EP | — | 48.4 | 2.1 | 32.8 | 12.8 | 0.3 |
| 7 | Cu(56)AL(16)Zn(28) | 0.3 | 7.2 | 52.2 | 19.9 | 17.9 | 8.4 | 0.5 |
| 8 | Cu(56)AL(16)Zn(28) | 0.1 | 21.6 | 59.3 | 14.9 | 15.5 | 5.3 | 0.4 |
| 9 | Cu(56)AL(16)Zn(28) | 0.05 | 43.3 | 48.4 | 2.1 | 32.8 | 12.8 | 0.4 |
| 10 | Cu(44)AL(12)Ti(44) | 0.3 | 7.2 | 58.1 | 2.9 | 24.4 | 10.7 | 0.5 |
| 11 | Cu(44)AL(12)Ti(44) | 0.1 | 21.6 | 64.7 | 2.4 | 24.0 | 7.1 | 0.4 |
| 12 | Cu(44)AL(12)Ti(44) | 0.05 | 43.3 | 52.9 | 13.2 | 22.5 | 8.7 | 0.0 |

[1] °C./min over the range 50°-180° C. EP reduction procedure: the catalyst is heated in 10 min to 150° C. and maintained at 150° C. for 22 hrs.
[2] Time in hours to traverse 50°-180° C.

Table 1 illustrates the effects of heating rate on the catalyst activity and selectivity relative to a constant-temperature reduction process. Not all the catalysts achieved their best activity and selectivity at the same heating rate. No more than routine tests will be needed to determine the optimum heating rate for a given composition.

EXAMPLES 13-18

The effect of varying the $H_2/N_2$ GHSV while maintaining a constant reduction heat rate on the hydrogenation activity of a Cu-Al-X catalyst is reported in Table 2.

If left uncontrolled, it is thought that the exothermic heat of the reduction reaction can drive the reaction forward too quickly and adversely affect the subsequent catalytic performance of the reduced catalyst.

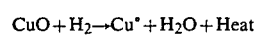

Several catalysts were reduced at 0.1° C./min (50°-180° C.) while varying the 1% $H_2/N_2$ GHSV from 600 to 5400 $hr^{-1}$. The reduced catalysts were screened using diethylmaleate as the ester feed at the standard operating (hydrogenation) conditions, and the results are reported below in Table 2.

TABLE 2
Effect of Reduction Gas GHSV on Catalyst Activity

| Ex. | Catalyst | Heat GHSV[1] | Rate[2] | EtOH | THF | g-BL | BD | DES |
|---|---|---|---|---|---|---|---|---|
| 13 | Cu(56)Al(16)Mg(28) | 600 | 0.1 | 54.7 | 2.6 | 23.8 | 7.1 | 7.8 |
| 14 | Cu(56)Al(16)Mg(28) | 1800 | 0.1 | 64.3 | 3.9 | 24.4 | 6.6 | 0.0 |
| 15 | Cu(56)Al(16)Mg(28) | 5400 | 0.1 | 52.7 | 3.3 | 17.8 | 12.2 | 8.7 |
| 16 | Cu(56)Al(16)Zn(28) | 600 | 0.1 | 50.1 | 17.6 | 18.3 | 10.5 | 2.2 |
| 17 | Cu(56)Al(16)Zn(28) | 1800 | 0.1 | 59.3 | 14.9 | 15.5 | 5.3 | 0.4 |
| 18 | Cu(56)Al(16)Zn(28) | 5400 | 0.1 | 46.6 | 16.0 | 21.9 | 10.5 | 3.9 |

[1] Units: hr$^{-1}$
[2] Units: °C./min

The flow rate of the gas used in the reduction step appears to have an effect on the activity level of the resulting catalyst in a fashion similar to the heating rate. The preferred combination of reduction gas flow rate and heating rate can be determined by one skilled in the art using routine experimentation.

EXAMPLES 19-38

These examples report the hydrogenation performance of a series of Cu-Al-X catalysts reduced (activated) in accordance with the present invention. Results are reported below in Table 3. A wide variety of Cu-Al-X catalysts were prepared and screened. Examples for X=Ti, Zn, and Mg are reported below. Standard reduction conditions and hydrogenation conditions were employed. In general, particularly active catalysts are obtained if the Al content is 10-20 wt %. Note that particularly high activity is observed (diethylsuccinate less than 5%) regardless of the Cu and X levels, as long as Al falls within 10-20 wt %. Various combinations of X=Mg+Zn and Mg+Ti also result in active hydrogenation catalysts.

TABLE 3
Hydrogenation of Diethylmaleate With Cu-Al-X Catalysts

| | | Products Approximate Weight Percent | | | | | |
|---|---|---|---|---|---|---|---|
| Example | Catalyst | EtOH | THF | BuOH | g-BL | BD | DES |
| 19 | Cu(53)Al(07)Ti(40) | 44.5 | 10.5 | 0.2 | 18.2 | 2.3 | 22.5 |
| 20 | Cu(27)Al(12)Ti(61) | 64.1 | 1.9 | 0.7 | 24.4 | 6.6 | 0.0 |
| 21 | Cu(44)Al(12)Ti(44) | 64.7 | 2.4 | 0.8 | 24.0 | 7.1 | 0.4 |
| 22 | Cu(72)Al(10)Ti(18) | 55.1 | 8.8 | 0.5 | 24.6 | 7.3 | 1.0 |
| 23 | Cu(60)Al(25)Ti(15) | 36.4 | 20.2 | 0.1 | 8.9 | 0.2 | 31.0 |
| 24 | Cu(42)Al(36)Ti(21) | 35.9 | 19.2 | 0.1 | 9.9 | 0.2 | 31.8 |
| 25 | Cu(60)Al(10)Zn(30) | 53.6 | 13.7 | 0.7 | 22.2 | 8.4 | 0.3 |
| 26 | Cu(44)Al(16)Zn(40) | 54.8 | 10.3 | 0.3 | 21.6 | 11.9 | 0.3 |
| 27 | Cu(30)Al(40)Zn(30) | 31.8 | 22.5 | 0.2 | 6.3 | 0.4 | 37.1 |
| 28 | Cu(45)Al(45)Zn(15) | 30.8 | 20.9 | 0.1 | 7.3 | 0.0 | 39.6 |
| 29 | Cu(20)Al(60)Zn(20) | 1.5 | 0.0 | 0.0 | 0.0 | 0.0 | 97.5 |
| 30 | Cu(70)Al(10)Mg(30) | 55.3 | 3.2 | 5.7 | 22.7 | 9.4 | 1.7 |
| 31 | Cu(56)Al(16)Mg(28) | 64.3 | 3.9 | 0.6 | 24.4 | 4.4 | 0.0 |
| 32 | Cu(20)Al(20)Mg(60) | 15.7 | 1.76 | 0.1 | 11.8 | 0.4 | 68.7 |
| 33 | Cu(30)Al(10)Ti(30)Mg(30) | 55.9 | 6.0 | 2.1 | 25.1 | 8.7 | 0.4 |
| 34 | Cu(50)Al(10)Ti(10)Mg(30) | 58.4 | 4.0 | 3.2 | 21.6 | 11.5 | 0.4 |
| 35 | Cu(50)Al(10)Ti(20)Mg(20) | 64.3 | 4.1 | 0.7 | 20.4 | 8.1 | 0.5 |
| 36 | Cu(44)Al(16)Ti(30)Mg(10) | 50.5 | 17.8 | 0.4 | 17.4 | 8.9 | 4.0 |
| 37 | Cu(44)Al(16)Ti(30)Mg(10) | 53.4 | 13.9 | 1.0 | 21.9 | 8.3 | 0.0 |
| 38 | Cu(60)Al(10)Ti(15)Mg(15) | 47.1 | 12.2 | 0.7 | 24.2 | 13.7 | 1.2 |

EXAMPLES 39-58

These examples illustrate the hydrogenation performance of various other Cu-Al-X catalysts prepared using the standard procedures. The catalyst were used to hydrogenate diethyl maleate. The results are reported below in Table 4. In each case the hydrogenation reaction was carried out using the standard conditions of 220° C., 450 psig, a LHSV of 0.6/hr and a GHSV of 15,000/hr.

TABLE 4

| Ex. | Catalyst | LHSV | Heat Rate | EtOH | THF | BuOH | g-BL | BD | DES |
|---|---|---|---|---|---|---|---|---|---|
| 39 | Cu(27):Al(12):Zr(61) | 0.6 | 0.1 | 18.5 | 0.2 | 0.7 | 10.5 | 3.3 | 65.0 |
| 40 | Cu(30):Al(12):Sn(58) | 0.6 | 0.05 | 8.3 | 0.1 | 0.6 | 4.4 | 0.7 | 84.5 |
| 41 | Cu(60):Al(12):Sn(28) | 0.6 | 0.05 | 49.3 | 0.5 | 2.3 | 15.6 | 5.3 | 25.9 |
| 42 | Cu(48):Al(40):Mg(12) | 0.6 | 0.1 | 43.4 | 29.7 | 0.1 | 6.2 | 0.1 | 17.3 |
| 43 | Cu(56):Al(16):Mg(28) | 0.6 | 0.1 | 64.3 | 3.9 | 0.6 | 24.4 | 4.4 | 0.0 |
| 44 | Cu(51):Al(11):Ti(2)Mg(20) | 0.6 | 0.1 | 64.3 | 4.1 | 0.7 | 20.4 | 8.1 | 0.5 |
| 45 | Cu(52):Al(15):Ni(33) | 0.6 | 0.1 | 38.2 | 4.1 | 0.7 | 13.3 | 2.6 | 32.2 |
| 46 | Cu(54):Al(15):Mg(14)Ni(2) | 0.55 | 0.1 | 53.4 | 3.4 | 1.3 | 18.5 | 15.1 | 2.8 |
| 47 | Cu(51):Al(15):Mg(26)Ni(1) | 0.6 | 0.05 | 47.5 | 3.0 | 0.8 | 24.0 | 9.4 | 12.3 |
| 48 | Cu(3):Al(12):Ti(56)Ni(02) | 0.6 | 0.05 | 28.7 | 0.3 | 1.1 | 10.0 | 0.8 | 55.9 |
| 49 | Cu(3):Al(12):Ti(5)Ni(08) | 0.55 | 0.05 | 27.9 | 0.5 | 1.2 | 10.9 | 7.2 | 47.7 |
| 50 | Cu(20):Al(60):Co(20) | 0.6 | 0.1 | 14.7 | 3.7 | 0.4 | 8.2 | 0.0 | 71.9 |
| 51 | Cu(40):Al(40):Co(20) | 0.6 | 0.1 | 53.4 | 5.8 | 1.3 | 22.4 | 9.2 | 0.9 |
| 52 | Cu(45):Al(45):Co(10) | 0.35 | 0.1 | 51.5 | 45.8 | 0.8 | 0.0 | 0.0 | 0.0 |

TABLE 4-continued

| Ex. | Catalyst | LHSV | Heat Rate | Products (wt %) | | | | | |
|---|---|---|---|---|---|---|---|---|---|
| | | | | EtOH | THF | BuOH | g-BL | BD | DES |
| 53 | Cu(47):Al(47):Co(06) | 0.6 | 0.1 | 35.6 | 24.6 | 0.1 | 7.5 | 0.2 | 29.9 |
| 54 | Cu(50):Al(16):Co(34) | 0.7 | 0.1 | 55.5 | 13.3 | 2.8 | 5.1 | 3.4 | 1.0 |
| 55 | Cu(55):Al(15):Mg(15):Co(15) | 0.6 | 0.1 | 53.2 | 5.4 | 1.3 | 21.0 | 7.9 | 3.9 |
| 56 | Cu(5):Al(16):Mg(28):Co(06) | 0.55 | 0.1 | 53.9 | 4.6 | 0.6 | 15.2 | 1.8 | 18.9 |
| 57 | Cu(3):Al(12):Ti(43):Co(15) | 0.6 | 0.1 | 41.2 | 0.2 | 2.1 | 17.4 | 6.9 | 24.1 |
| 58 | Cu(3):Al(12):Ti(50):Co(08) | 0.6 | 0.05 | 30.3 | 0.2 | 1.0 | 15.1 | 5.2 | 44.2 |

EXAMPLES 59-67

In these examples, Cu-Al-X catalysts of various compositions from the previous examples were used for hydrogenating dibutyl maleate (DBM). The hydrogenation reaction was carried out using the standard conditions of 220° C., 450 psig, and a GHSV of 15,000/hr. The results are reported below in Table 5.

TABLE 5

| Ex. | Catalyst | LHSV | Products (wt %) | | | | |
|---|---|---|---|---|---|---|---|
| | | | THF | BuOH | g-BL | 1,4-BD | DBM[2] |
| 59 | Cu(27):Al(12):Ti(61) | 0.6 | 0.3 | 73.0 | 20.1 | 4.7 | 0.0 |
| 60 | Cu(56):Al(16):Mg(28) | 0.6 | 0.9 | 66.7 | 19.6 | 10.5 | 0.0 |
| 61 | Cu(27):Al(12):Ti(61) | 1.2 | 0.2 | 69.9 | 19.7 | 7.6 | 1.9 |
| 62 | Cu(72):Al(10):Ti(18) | 1.2 | 4.3 | 69.3 | 18.1 | 7.0 | 0.2 |
| 63 | Cu(56):Al(16):Mg(28) | 1.2 | 0.7 | 71.2 | 19.4 | 6.9 | 0.7 |
| 64 | Cu(48):Al(40):Mg(12) | 1.2 | 20.8 | 62.8 | 7.1 | 0.1 | 6.5 |
| 65 | Cu(51):Al(11):Ti(19):Mg(19) | 1.2 | 2.0 | 72.1 | 18.6 | 6.3 | 0.1 |
| 66 | Cu(56):Al(16):Zn(28) | 1.2 | 6.2 | 69.3 | 17.6 | 5.8 | 0.6 |
| 67 | Cu(40):Al(30):Co(30) | 1.2 | 7.4[1] | 72.4 | 5.1 | 1.5 | 0.3 |

Key:
[1]In this run n-propanol = 11.5 wt %
[2]Unreacted DBM in product

EXAMPLES 68-72

In these examples, hydrogenation of butyl acetate (BuOAc) was carried out with various Cu-Al-X catalysts. In this case the desired products are ethanol (EtOH) and n-butanol (BuOH) according to the following reaction:

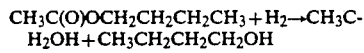

CH$_3$C(O)OCH$_2$CH$_2$CH$_2$CH$_3$+H$_2$→CH$_3$C-H$_2$OH+CH$_3$CH$_2$CH$_2$CH$_2$OH

The hydrogenation reaction was conducted at the standard conditions of 220° C., 450 psig and a GHSV of 15,000/hr. The results are reported below in Table 6.

TABLE 6

| Example | Catalyst | LHSV | Products (wt %) | | |
|---|---|---|---|---|---|
| | | | EtOH | BuOH | BuOAc |
| 68 | Cu(56):Al(16):Mg(28) | 0.6 | 35.1 | 63.4 | 0.07 |
| 69 | Cu(27):Al(12):Ti(61) | 0.6 | 35.1 | 63.4 | 0.06 |
| 70 | Cu(27):Al(12):Ti(61) | 1.2 | 28.8 | 61.3 | 6.4 |
| 71 | Cu(72):Al(20):Ti(18) | 1.2 | 33.8 | 63.9 | 0.2 |
| 72 | Cu(56):Al(16):Zn(28) | 1.2 | 34.3 | 63.0 | 0.3 |

Key:
BuOAc is unreacted Butyl acetate.

The results demonstrate that mono-esters are readily hydrogenated to their corresponding alcohols with Cu-Al-X catalysts according to the present invention.

EXAMPLES 73-76

In the following examples a Cu(27)Al(12)Ti(61) catalyst was examined at various hydrogenation conditions for the hydrogenation of diethyl maleate. In each case the catalyst was reduced using the standard reduction conditions including a gradually increasing temperature (rate of 0.1° C./mn) over the temperature range of 50°-180° C. The hydrogenation results are presented below in Table 7.

TABLE 7

| Exam. | LHSV (hr$^{-1}$) | temp (°C.) | psi | GHSV (hr$^{-1}$) | Products (wt %) | | | | | |
|---|---|---|---|---|---|---|---|---|---|---|
| | | | | | ETOH | THF | BuOH | g-BL | 1,4BD | DES |
| 73 | 0.6 | 220 | 450 | 10000 | 68.4 | 2.6 | 1.2 | 21.4 | 4.7 | 0.9 |
| 74 | 0.6 | 220 | 450 | 20000 | 55.9 | 1.4 | 0.6 | 26.9 | 11.2 | 3.4 |
| 75 | 0.6 | 220 | 600 | 15000 | 59.8 | 2.4 | 1.0 | 17.9 | 7.6 | 0.5 |
| 76 | 0.6 | 250 | 450 | 15000 | 57.4 | 4.5 | 4.6 | 25.8 | 6.3 | 0.0 |

EXAMPLES 77-80

Cu-Al-Zn catalysts of various compositions were prepared using the standard procedures and were examined in the hydrogenation of diethyl maleate. In each case the hydrogenation reaction was carried out using the standard conditions including 220° C., 450 psig and GHSV=15000/hr. The results are presented below in Table 8.

TABLE 8

| Ex. | Catalyst (wt %) | LHSV (hr$^{-1}$) | Heat Rate (°C./min) | Products | | | | | |
|---|---|---|---|---|---|---|---|---|---|
| | | | | EtOH | THF | BuOH | g-BL | 1,4BD | DES |
| 77 | Cu(27)Al(12)Zn(68) | 0.6 | 0.1 | 51.9 | 3.6 | 0.4 | 20.7 | 15.3 | 6.3 |
| 78 | Cu(40)Al(40)Zn(20) | 0.45 | 0.1 | 43.6 | 32.0 | 0.2 | 5.7 | 0.0 | 16.9 |
| 79 | Cu(56)Al(16)Zn(28) | 0.6 | 0.1 | 59.3 | 14.9 | 0.3 | 15.5 | 5.3 | 0.4 |
| 80 | Cu(70)Al(10)Zn(20) | 0.45 | 0.05 | 57.8 | 11.2 | 0.3 | 18.4 | 5.7 | 5.2 |

While certain specific embodiments of the invention have been described with particularity herein, it will be recognized that various modifications thereof will occur to those skilled in the art, and it is to be understood that such modifications and variations are to be included within the purview of this application and the spirit and scope of the appended claims.

What is claimed is:

1. A reduced catalyst composition comprising copper, aluminum, and a metal, X, selected from the group consisting of magnesium, zinc, titanium, and mixtures thereof; made by a process comprising:

reducing a mixture of the oxides of copper, aluminum, and X by heating in the presence of a reducing gas under activating conditions which comprise gradually increasing the temperature from an ititial temperature of about 50° C. to a final temperature of about 180° C. at a rate of about 3° C. to about 6° C. per hour.

* * * * *